(12) United States Patent
Baker et al.

(10) Patent No.: US 6,257,937 B1
(45) Date of Patent: Jul. 10, 2001

(54) CABLE COVER

(75) Inventors: Frank P. Baker, Chatham; Theodore A. Conorich, Parsippany Township, Morris County; Michael J. Konyak, Clifton; William J. Ivan, Woodbridge, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/330,120

(22) Filed: Jun. 10, 1999

Related U.S. Application Data

(60) Provisional application No. 60/129,561, filed on Apr. 16, 1999.

(51) Int. Cl.[7] ...................................... H01R 9/22
(52) U.S. Cl. .......................................... 439/718; 439/491
(58) Field of Search .................................... 439/491, 709, 439/715, 718, 719; 174/138 F

(56) References Cited

U.S. PATENT DOCUMENTS

| | | | |
|---|---|---|---|
| 4,417,781 | * | 11/1983 | Johnston et al. . |
| 4,580,864 | * | 4/1986 | Knickerbocker . |
| 4,811,169 | * | 3/1989 | De Luca et al. ...................... 361/429 |
| 4,861,287 | * | 8/1989 | Bevacqua et al. ................... 439/718 |
| 5,718,604 | | 2/1998 | Conorich et al. . |

OTHER PUBLICATIONS

Product Application Guide, *110 Connector Systems for Premises Application*, Issue 4, Apr. 1994.

\* cited by examiner

*Primary Examiner*—Khiem Nguyen
(74) *Attorney, Agent, or Firm*—Gibbons, Del Deo, Dolan, Griffinger & Vecchione

(57) ABSTRACT

A protective cable cover separates cable routing from patchcords and cross-connect wire in a wiring trough. The cable cover is placed over the cable conductors on a wiring block cable organizer. A circuit designation strip and row marking pads are provided to designate rows and circuit connections. A strike engages a latch on a patchcord plug to releasably retain the plug in engagement with the wiring block. Mounting holes are formed integral with the cable cover to engage latches on the cable organizer for releasably mounting the cable cover on the cable organizer.

10 Claims, 5 Drawing Sheets

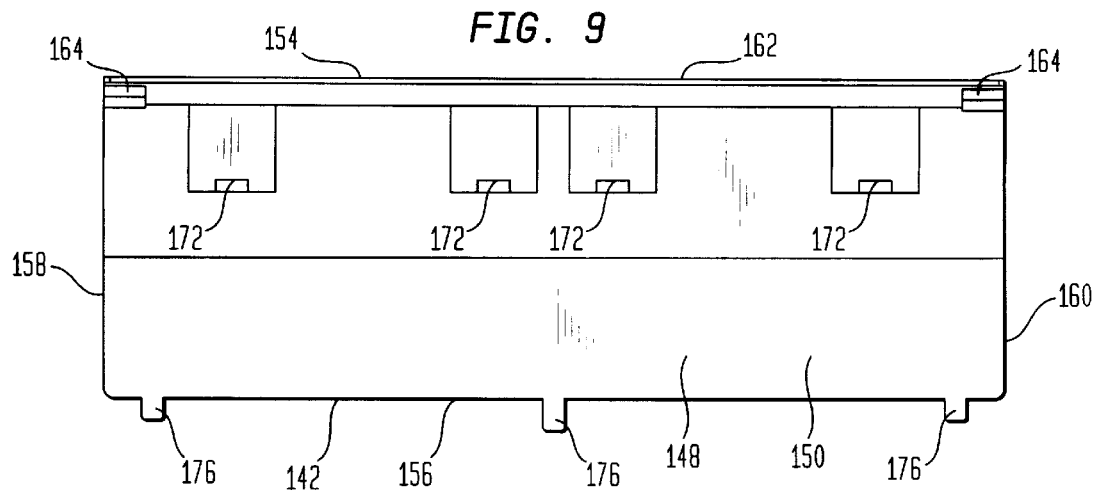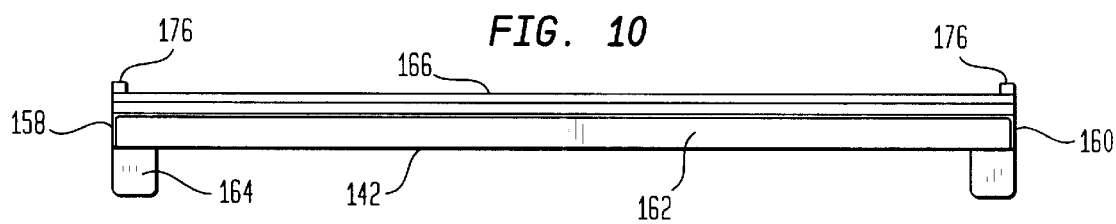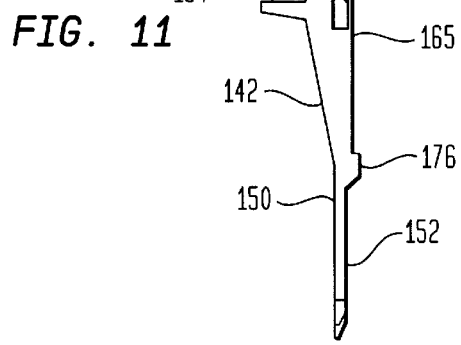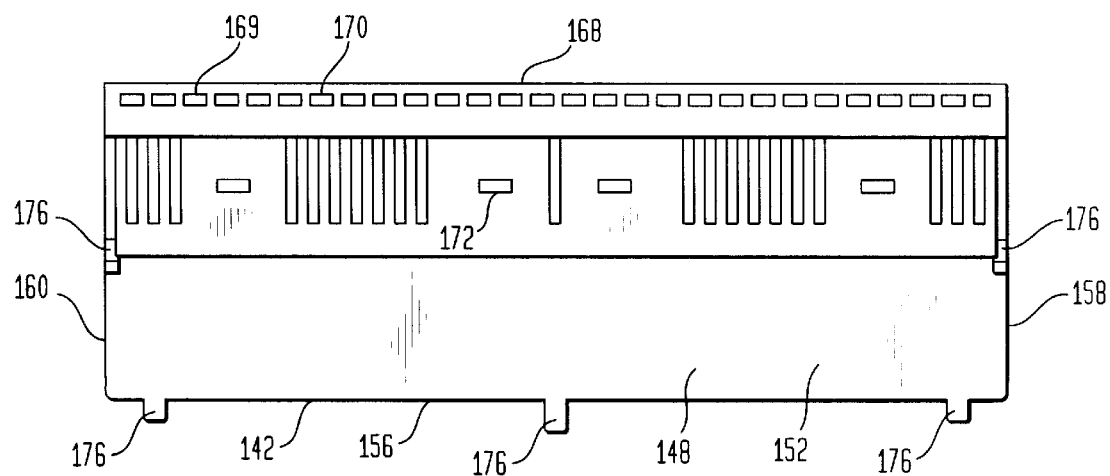

CABLE COVER

CROSS REFERENCE TO RELATED APPLICATIONS

This application claims the benefit of U.S. Provisional Application Ser. No. 60/129,561, filed on Apr. 16, 1999. This application is related to copending application Ser. No. 09/329,573 entitled "Twenty Eight Pair Cabling System" filed on Jun. 10, 1999, copending application Ser. No. 09/329,438 entitled "Cable Organizer With Conductor Termination Array" filed on Jun. 10, 1999, and copending application Ser. No. 09/329,444 entitled "Printed Wiring Board Cable Cover" filed on Jun. 10, 1999.

FIELD OF THE INVENTION

This invention relates to the field of telecommunications, and more particularly to connectors for use in telecommunication system cabling.

BACKGROUND OF THE INVENTION

The telecommunications and data management industries utilize connective hardware for general building wiring, premises distribution systems, local area networks, and other network applications. The connective hardware known as the 110 Connector Systems has become a standard of the industry because of the reliable gas-tight connection provided by the 110 Insulation Displacement Connector. This miniature quick-connect terminating system is listed or approved by Underwriters Laboratories, the Canadian Standards Association, and the Australian Standards Association. The 110 Connector Systems have gained type approval from such countries as the United Kingdom, Japan, Korea, and others.

The 110 Connector System consists of field-wired cable termination apparatus that is used to organize and administer cable and wiring installations. The main cross-connect is typically located in the equipment room and provides termination and cross-connection of network interface equipment, switching equipment, processor equipment, and backbone (riser or campus) wiring. The horizontal cross-connect is typically located in the telecommunications closet and provides termination and cross-connection of horizontal (to the work area) and backbone wiring. Cross-connects provide efficient and convenient routing and rerouting of common equipment circuits to various parts of a building or campus.

The 110 Connector Systems enable cable and wiring installations to be handled by technical or non-technical end user personnel. Line moves and rearrangement for the cabling termined at a cross connect can be performed with patchcords (plug-ended jumpers) or cross-connect wire. The patchcords are used where the highest system integrity is required.

Referring now to FIGS. 1, 2, and 3, the prior art 110 Connector System 10 was designed to have its connector ports 15 arranged in horizontal rows in uniformly spaced conductor termination arrays (index strips). FIG. 1 shows four rows of index strips 14 mounted in a typical wiring block 12. The spaces between these index strips become troughs, and are alternately dedicated as either cable routing troughs 16 or cross-connect wire routing troughs 18.

Unsheathed cable conductors 20 are routed through the cable troughs 16 to their appropriate termination ports in the index strips 14. All cable sheaths stop at the entrance to the cable troughs 16. Each cable trough 16 feeds conductors to the two index strips that form its sides.

Connecting blocks 22, each containing several contact elements 24 in pairs, are placed over the index strips 14 and make electrical connections to the cable conductors 20. These connecting blocks 22 also form the side walls of the troughs 16 and 18. A designation strip 26 is placed within the cable trough 16, near the top of the connecting blocks 22. This strip 26 extends the full length of the cable trough 16, covering the cable conductors 20, and allows the cable connector ports 15 to be visibly labeled as an indication of where the other end of the cables are attached. A pair of row marking surfaces 27 are provided to label each row.

Cross-connect wire (not shown) or patch cords 28 are terminated in the ports 25 on the top of the connecting blocks 22. Cross-connect wires, when used, are routed to their appropriate ports 15 through the cross-connect troughs 18 between the cable troughs 16. The connecting blocks 22 form the separator between cable conductors 20 and cross-connect conductors. When patch cords 28 are used, the cross-connect troughs 18 remain empty.

The 110 patchcords 28 are available now in two versions. The old version is a forward-engaging patchcord 28 that uses a forward-engaging plug 30 as shown in FIG. 1. The patchcord 28 projects outward from the connecting block 22, is routed through ducts 32, backboards 34, and troughs 36 to another connecting block 22, as shown in FIG. 3.

The new version patchcord that uses a reverse-engaging plug. The new patchcord is further described in U.S. Pat. No. 5,718,604 entitled Patch Cord Connection System issued on Feb. 17, 1998 and is incorporated herein by reference.

SUMMARY OF THE INVENTION

In accordance with the present invention, there is provided a cable cover, for use in connection with a cable organizer, cable conductors, a connecting block, and a patchcord plug. The cable cover comprises a plate having front and rear surfaces extending between opposite upper and lower edges, and between opposite first and second ends. The plate rear surface is juxtaposed with the cable organizer to protect the cable conductors. Mounting means is provided for releasably mounting the cable cover on the cable organizer.

BRIEF DESCRIPTION OF THE DRAWING

A more complete understanding of the present invention may be obtained from consideration of the following description in conjunction with the drawing, in which:

FIG. 9 is a front elevational view of another cable cover constructed in accordance with the invention;

FIG. 10 is a top plan view of the cable cover of FIG. 9;

FIG. 11 is a side elevational view of the cable cover of FIG. 9; and

FIG. 12 is a rear elevational view of the cable cover of FIG. 9.

DESCRIPTION OF THE PREFERRED EMBODIMENTS

Figure 1:
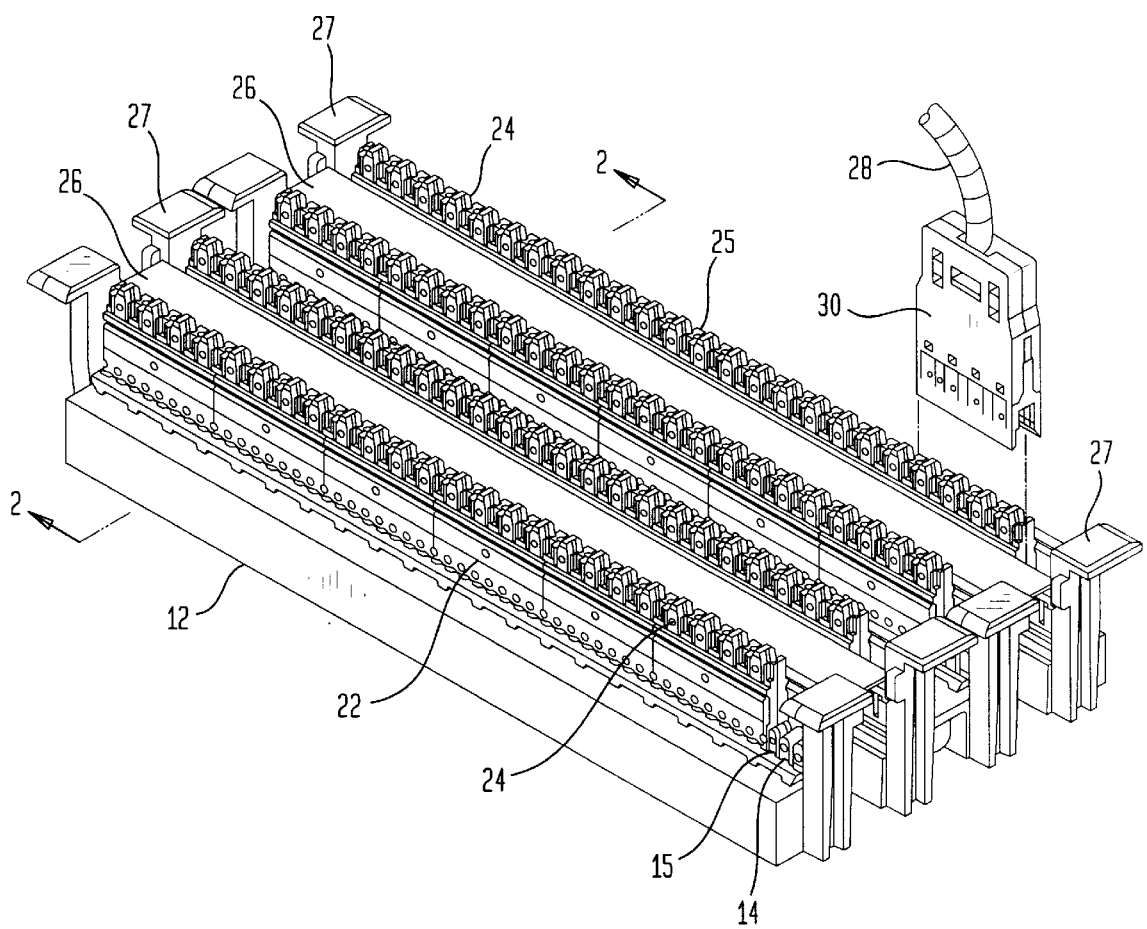
FIG. 1 is a perspective view of a prior art wiring block, including connection blocks and a forward-engaging patchcord plug.
Figure 2:
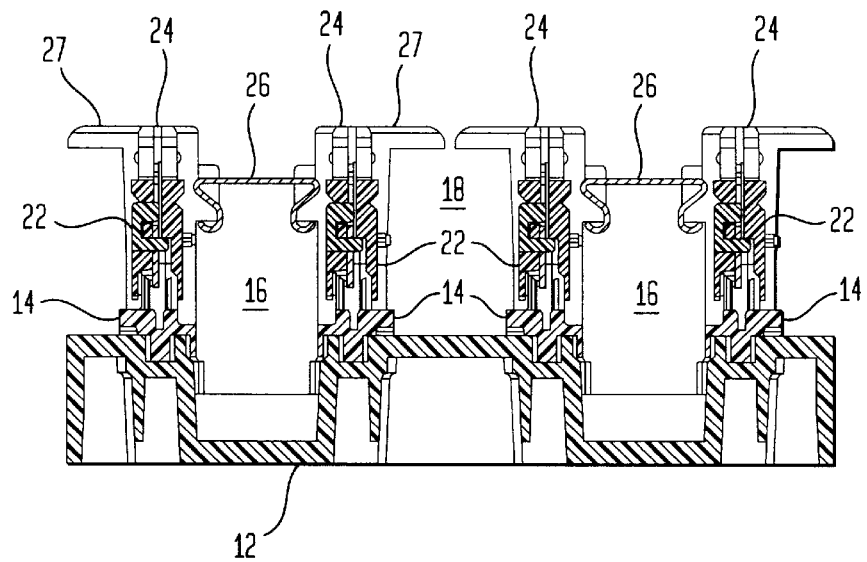
FIG. 2 is a cross-sectional view of the prior art wiring block of FIG. 1, taken along lines 2—2 of FIG. 1.
Figure 3:
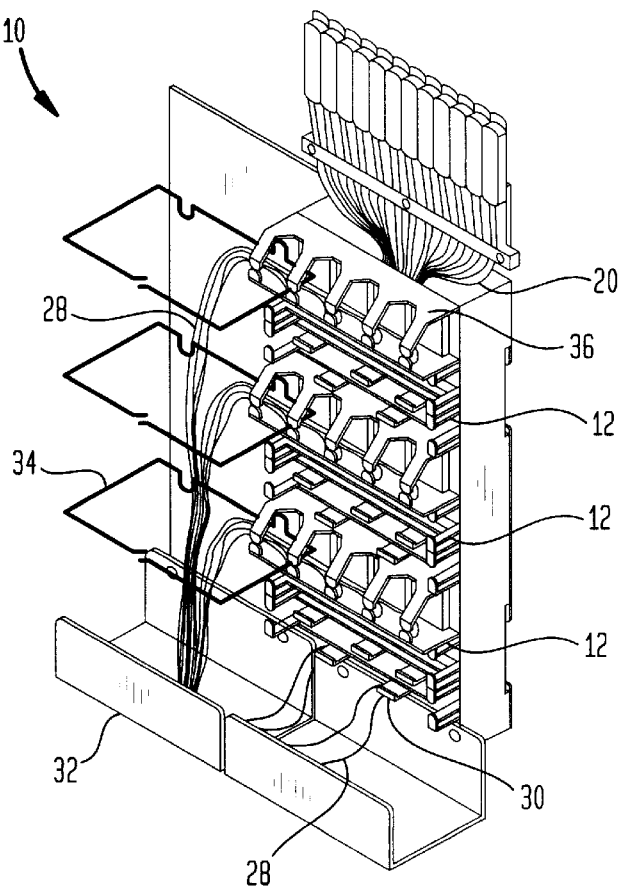
FIG. 3 is a perspective view of a prior art 110 Connector System, showing the prior art wiring block, patchcords and troughs.
Figure 4:
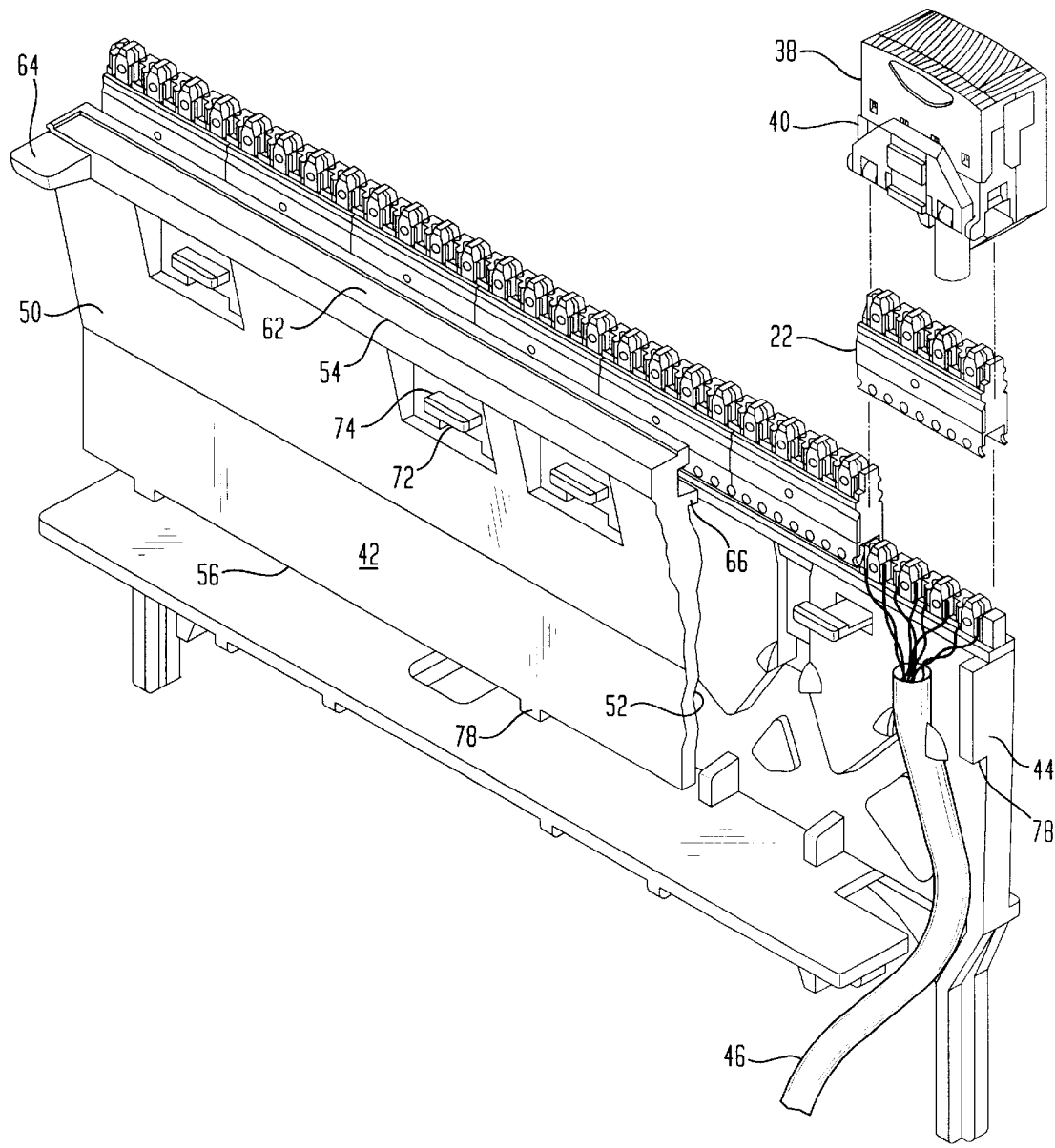
FIG. 4 is a perspective view of a cable cover constructed in accordance with the invention showing the cable cover partially cut-away, a conductor termination array, connecting blocks, and a patchcord plug in a partially exploded assembly.
Figure 5:
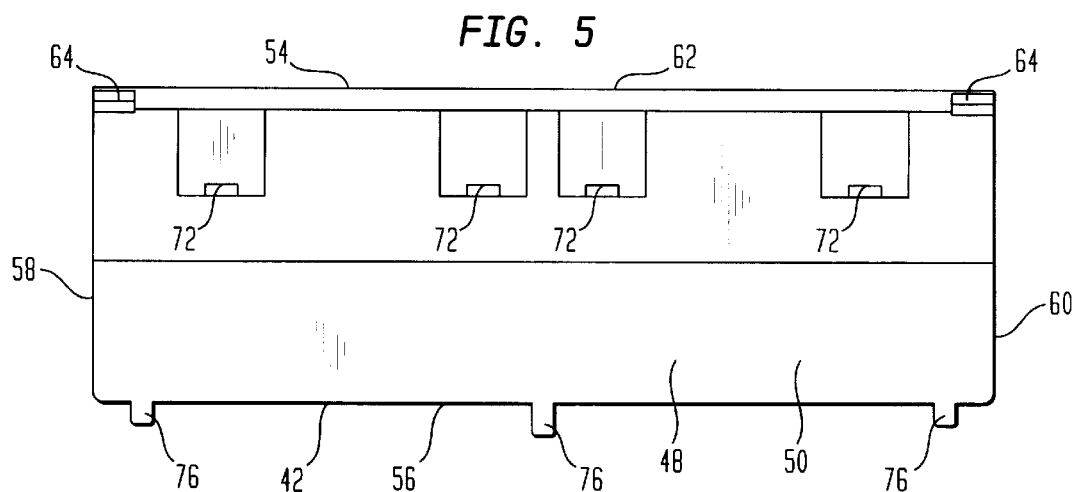
FIG. 5 is a front elevational view of the cable cover of FIG. 4.
Figure 6:
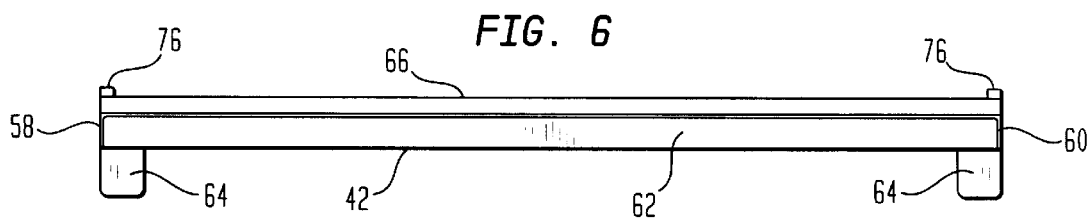
FIG. 6 is a top plan view of the cable cover of FIG. 4.
Figure 7:
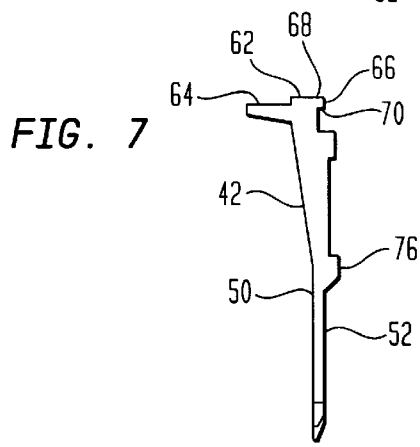
FIG. 7 is a side elevational view of the cable cover of FIG. 4.
Figure 8:
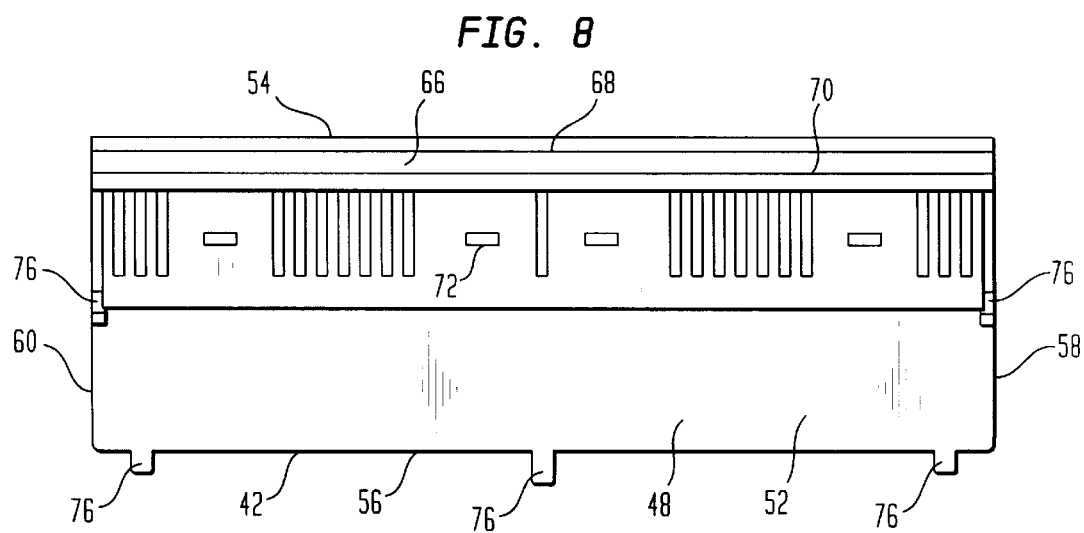
FIG. 8 is a rear elevational view of the cable organizer of FIG. 4.

The new version reverse-engaging patchcord 38 uses a reverse-engaging plug 40 as shown in FIG. 4. The new patchcord 38 projects inward. Every trough now potentially carries three types of conductor: patchcords 38 (including those with a reverse-engaging plug), cable conductors 20, and cross-connect conductors. Consequently, the troughs are crowded, making the conductors difficult to trace. The crowding of unsheathed cable conductors can result in cross-talk and other electrical problems, and, the new reverse-engaging patchcord 38 can snag on wiring while being pulled out. In order to partly address these problems, the wiring block has index strips that are elevated upon a cable organizer and set wider apart to enlarge the troughs. Channels direct the cable conductors across the cable organizer front surface toward the termination array. The cable conductors are sheathed up to the termination array, helping to organize the cable conductors, reduce cross-talk, and improve electrical performance.

Referring now to the drawings, and especially to FIGS. 4, 5, 6, 7, and 8, a cable cover 42 is provided in connection with a cable organizer 44, cables 46, a connecting block 22, and a patchcord plug 40. The cable cover 42 comprises a plate 48, having front 50 and rear 52 surfaces extending between opposite upper 54 and lower 56 edges, and between opposite first 58 and second 60 ends. The plate rear surface 52 is juxtaposed with the cable organizer 44 to protect the cables 46.

Recording means is provided for recording indicia on the cable cover 42 to designate rows and circuit connections. Specifically, a circuit designation strip 62 is disposed along the plate upper edge 54. At least one, and preferably two row marking pads 64 are disposed on the plate upper edge 54.

Patchcord retaining means is provided for retaining the patchcord plug 40 in engagement with the connecting block 22. Specifically, a patchcord strike 66 projects transversely outward from the plate rear surface 52 adjacent the plate upper edge 54. The patchcord strike 66 has front 68 and rear 70 faces disposed transversely to the plate rear surface 52. Thus, the front 68 and rear 70 faces will engage a latch on the patchcord plug 40 to releasably retain the patchcord plug 40 in engagement with the connecting block 22.

Mounting means is provided for releasably mounting the cable cover 42 on the cable organizer 44. Typically, at least one, and preferably several, holes defining mounting strikes 72 are formed integral with the plate 48. The mounting strikes 72 engage with latches 74 on the cable organizer 44. At least one, and preferably several, fingers 76 project outward from the plate 48, for engagement with corresponding recesses 78 in the cable organizer 44.

Turning now to FIGS. 9, 10, 11, and 12, as well as FIG. 4, a second embodiment of the cable cover is disclosed, and is very similar to the above-described invention. A cable cover 142 is used in connection with a cable organizer 44, cables 46, a connecting block 22, and a second patchcord plug (not shown, but similar to plug 40). The cable cover 142 comprises a plate 148, having front 150 and rear 152 surfaces extending between opposite upper 154 and lower 156 edges, and between opposite first 158 and second 160 ends. The plate rear surface 152 is juxtaposed with the cable organizer 44 to protect the cable conductors 46.

Recording means is provided for recording indicia on the cable cover 142 to designate rows and circuit connections. Specifically, a circuit designation strip 162 is disposed along the plate upper edge 154. At least one, and preferably two row marking pads 164 are disposed on the plate upper edge 154.

Patchcord retaining means is provided for retaining the patchcord plug in engagement with the connecting block 22. Specifically, a patchcord strike 166 has a proximal edge 165 attached to the plate rear surface 152 adjacent the plate upper edge 154. The patchcord strike 166 projects outward to a distal edge 167 defining a front face 168. The patchcord strike 166 extends between the plate first 158 and second 160 ends, and is disposed generally parallel to the plate rear surface 152. The patchcord strike 166 has a plurality of holes 169 therethrough spaced apart between the plate first 158 and second 160 ends. The holes 169 have edges defining a rear face 170, so that the front 168 and rear faces 170 will engage a latch on the patchcord plug to releasably retain the patchcord plug in engagement with the connecting block 22.

Mounting means is provided for releasably mounting the cable cover 142 on the cable organizer 44. Typically, at least one, and preferably several, holes defining mounting strikes 172 are formed integral with the plate 148. The mounting strikes 172 engage with latches 74 on the cable organizer 44. At least one, and preferably several, fingers 176 project outward from the plate 148, for engagement with corresponding recesses 78 in the cable organizer 44.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed:

1. A cable cover for use in connection with a cable organizer, cable conductors, a connecting block and a patchcord having a patchplug, the cable cover comprising:

a plate, the plate having front and rear surfaces extending between opposite upper and lower edges, an between opposite first and second ends, the plate rear surface being juxtaposed with the cable organizer to protect the cable conductors; and mounting means for releasably mounting the cable cover on the cable organizer;

patchcord retaining means for retaining the patchcord plug in engagement with the connecting block; and recording means for recording indicia on the cable cover to designate rows and circuit connections;

wherein the cable cover and the cable organizer separate the cable conductor from the patchcord.

2. The cable cover of claim 1, wherein the recording means includes:

a circuit designation strip disposed along the plate upper edge; and at least one row marking pad disposed on the plate upper edge.

3. The cable cover of claim 1, wherein the patchcord retaining means includes a patchcord strike projecting transversely outward from the plate rear surface adjacent the plate upper edge, the patchcord strike having a rear face disposed transversely to the plate rear surface for engagement with a latch on the patchcord plug.

4. The cable cover of claim 1, wherein the patchcord retaining means includes a patchcord strike projecting outward from and generally parallel to the plate rear surface adjacent the plate upper edge, the patchcord strike having a plurality of spaced apart holes therethrough, the holes having edges defining a rear face for engagement with a latch on the patchcord plug.

5. The cable cover of claim 1, wherein the mounting means further comprises at least one mounting strike integral with the plate for engagement with a latch on the cable organizer.

6. A cable cover, for use in connection with a cable organizer, cable conductors, a connecting block and a patchcord having a patchplug, the cable cover comprising:
   a plate, the plate having front and rear surfaces extending between opposite upper and lower edges, and between opposite first and second ends, the plate rear surface being juxtaposed with the cable organizer to protect the cable conductors;
   recording means for recording indicia on the cable cover to designate rows and circuit connections;
   patchcord retaining means for retaining the patchcord plug in engagement with the connecting block; and
   mounting means for releasably mounting the cable cover on the cable organizer;
   wherein the cable cover and the cable organizer separate the cable conductors from the patchcord.

7. The cable cover of claim 6, wherein the recording means includes:
   a circuit designation strip disposed along the plate upper edge; and
   at least one row marking pad disposed on the plate upper edge.

8. The cable cover of claim 6, wherein the patchcord retaining means includes a patchcord strike projecting transversely outward from the plate rear surface adjacent the plate upper edge, the patchcord strike having front and rear faces disposed transversely to the plate rear surface, so that the front and rear faces will engage a latch on the patchcord plug to releasably retain the patchcord plug in engagement with the connecting block.

9. The cable cover of claim 6, wherein the patchcord retaining means includes a patchcord strike projecting outward from a proximal edge attached to the plate rear surface adjacent the plate upper edge to a distal edge defining a front face, the patchcord strike extending between the plate first and second ends, the patchcord strike being disposed generally parallel to the plate rear surface, the patchcord strike having a plurality of holes therethrough spaced apart between the plate first and second ends, the holes having edges defining a rear face, so that the front and rear faces will engage a latch on the patchcord plug to releasably retain the patchcord plug in engagement with the connecting block.

10. The cable cover of claim 6, wherein the mounting means further comprises:
    at least one mounting strike integral with the plate for engagement with a latch on the cable organizer; and
    at least one finger projecting outward from the plate, for engagement with a corresponding recess in the cable organizer.

* * * * *